(12) United States Patent
Gohda

(10) Patent No.: US 7,408,581 B2
(45) Date of Patent: Aug. 5, 2008

(54) IMAGE PROCESSING APPARATUS

(75) Inventor: Makoto Gohda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 10/108,479

(22) Filed: Mar. 29, 2002

(65) Prior Publication Data

US 2002/0154226 A1    Oct. 24, 2002

(30) Foreign Application Priority Data

Apr. 3, 2001    (JP) ............................ 2001-104756

(51) Int. Cl.
*H04N 5/222*    (2006.01)

(52) U.S. Cl. .............................. 348/333.05; 348/220.1; 348/231.2; 348/231.9

(58) Field of Classification Search .............. 348/220.1, 348/231, 333.05, 231.9, 231.2; 386/69, 65, 386/68
See application file for complete search history.

(56) References Cited

U.S. PATENT DOCUMENTS

| | | | | |
|---|---|---|---|---|
| 5,237,648 | A * | 8/1993 | Mills et al. | 715/723 |
| 6,118,925 | A * | 9/2000 | Murata et al. | 386/83 |
| 6,449,608 | B1 * | 9/2002 | Morita et al. | 707/3 |
| 2002/0197060 | A1 * | 12/2002 | Itoh et al. | 386/69 |

* cited by examiner

*Primary Examiner*—Lin Ye
*Assistant Examiner*—Anthony J Daniels
(74) *Attorney, Agent, or Firm*—Fitzpatrick, Cella, Harper & Scinto

(57) ABSTRACT

An image processing apparatus for inputting a moving image file containing moving image data representing a series of moving images, and still image data of a plurality of pictures related to the moving image data, selecting representative still image data from the still image data of the plurality of pictures of the inputted moving image file, recording identification information for identifying the selected representative still image data in the moving image file.

15 Claims, 6 Drawing Sheets

IMAGE PROCESSING APPARATUS

BACKGROUND OF THE INVENTION

1. Field of the Invention

The present invention relates to an image processing apparatus and, more particularly, to processing of a representative picture of a moving image file.

2. Related Background Art

Recently, a camera-integrated digital disk recorder has been proposed for recording photographed moving image data as a moving image file. Also, a digital camera has been proposed for recording photographed moving image data as a moving image file in a solid memory such as a memory card.

In such apparatus, a user selects and reproduces a target moving image file from a plurality of recorded moving image files by verifying a thumbnail (index) image corresponding to each moving image file.

The thumbnail image is a still image, in which a representative picture corresponding to each moving image file is reduced from a normal size, and it has been suggested to use one frame being at a head of each moving image data as a representative picture.

However, depending on a content to be photographed, a head frame of each moving image data does not always represent the moving image data. If such a head frame is used as a thumbnail, it may be difficult for the user to search the target moving image file.

For example, if photographing is started in a fading-in manner from a black picture screen, a thumbnail prepared from the head frame is displayed on a totally black picture and, consequently, a content of the moving image frame cannot be determined from this thumbnail.

In order to avoid the above-described problem, instead of the head frame, one frame positioned after a passage of a given period from the head may be employed as a thumbnail image.

Such a case is effective when photographing is started in the fading-in manner from the black picture screen. However, data of a moving image photographed by the user contains a variety of contents, and thus the above-described case is not effective for all of the contents.

Especially, to make use of features of a digital disk camera or a digital camera capable of randomly designating and reproducing a plurality of recorded moving image files, it is important to provide a method of more easily forming a thumbnail image to the user so that the user can easily understand contents of the thumbnail image intuitively when selecting a target moving image file.

SUMMARY OF THE INVENTION

An object of the present invention is to solve the foregoing problems.

Another object of the present invention is to set a representative picture representing a content of moving image data well by a simple operation.

In order to attain the above-described object, in accordance with an aspect of the invention, there is provided an image processing apparatus comprising: inputting means for inputting a moving image file containing moving image data representing a series of moving images, and still image data of a plurality of pictures related to the moving image data; selecting means for selecting representative still image data from the still image data of the plurality of pictures of the moving image file inputted by the inputting means; and recording means for recording identification information for identifying the selected representative still image data in the moving image file.

These and other objects, and features of the present invention will become apparent upon reading of detailed description of the embodiments with reference to the accompanying drawings.

DETAILED DESCRIPTION OF THE PREFERRED EMBODIMENTS

Hereinafter, description will be made of the preferred embodiments of the present invention.

First, description is made of a first embodiment of the invention.

Figure 1:
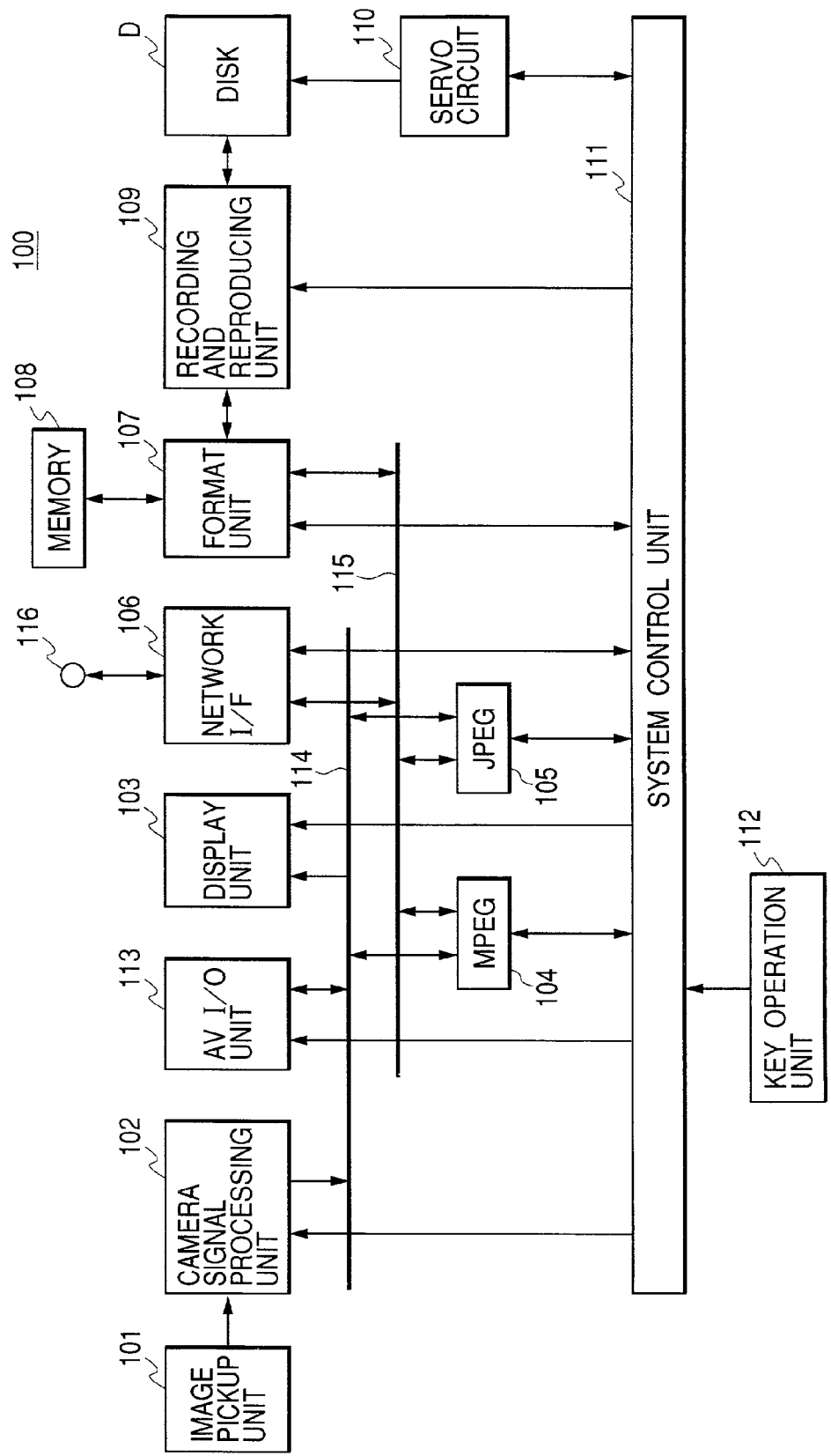
FIG. 1 is a block diagram showing a configuration of a camera recorder, to which the present invention is applied.

FIG. 1 is a block diagram showing a configuration of a digital disk camera recorder (referred to as camcorder hereinafter) 100, to which the invention is applied.

In FIG. 1, a reference numeral 101 denotes an image pickup unit, which uses a CCD as an image pickup element; 102 a camera signal processing unit; 103 a display unit, a liquid crystal panel being used as such in the embodiment; 104 an MPEG circuit for encoding/decoding moving image data; 105 a JPEG circuit for encoding/decoding still image data; and 106 a network I/F circuit for transferring data according to serial bus I/F Standard of IEEE1394 in the embodiment.

A reference numeral 107 denotes a format unit; 108 a work memory of the format unit 107; and 109 a recording and reproducing unit including a laser pickup, a magnetic head and other well-known elements in the embodiment. A reference code D denotes a magneto-optical disk. A reference numeral 110 denotes a servo circuit including a spindle motor and the like for rotary-driving the camcorder 100; 111 a system control unit which controls each element of the camcorder 100; 112 a key operation unit; 113 an audio video (AV) I/O unit; 114 a base band data bus; 115 an encoded data bus; and 116 a network terminal.

Next, description is made of a basic flow of a recording operation of the camcorder 100 of FIG. 1.

Moving image data obtained by the image pickup unit 101 is subjected to signal-processing at the camera signal processing unit 102, and then outputted through the data bus 114 to the MPEG circuit 104 and the JPEG circuit 105. The MPEG circuit 104 encodes the moving image data outputted from the camera signal processing unit 102 in a format conformed to MPEG 2, and outputted through the data bus 115 to the format unit 107. For the moving image data outputted from the MPEG circuit 104, the format unit 107 executes packetizing according to a recording format of a disk D or encoding for a disk file system, and outputs the processed data to the recording and reproducing unit 109. The recording and reproducing unit 109 records the data outputted from the format unit 107 as a moving image file in the disk D by using a well-known laser pickup or magnetic disk.

On the other hand, the JPEG circuit 105 extracts image data of one frame from the moving image data supplied through the data bus 114 from the camera signal processing unit 102 at every fixed period, reduces its size, and encoding the extracted image data according to JPEG Standard, thus generating candidate data of a thumbnail image. Here, the thumbnail candidate data regards a candidate of a thumbnail image possibly used as a thumbnail to characterize moving image data that has been recorded. In the embodiment, normally, a plurality of frames are present as the candidates for one moving image file.

The thumbnail candidate data generated by the JPEG circuit 105 is sent through the data bus 115 to the format unit 107. The format unit 107 temporarily stores the received thumbnail candidate data in the work memory 108, and then outputs the data to the recording and reproducing unit 109 at a predetermined timing. A recording timing of the thumbnail candidate data will be described later. The recording and reproducing unit 109 records the thumbnail candidate data in a predetermined position in the moving image file to be recorded on the disk D.

The servo circuit 110 properly controls rotation of the disk D or a posture of the pickup so as to enable the data to be correctly recorded and reproduced. The system control unit 111 controls an operation of the entire apparatus so as to match the components with one another.

The system control unit 111 interprets a key input from the key operation unit 112 (e.g., "RECORDING START", "REPRODUCING START", "STOP" or the like), and controls an operation of the entire camcorder 100.

Figure 2:
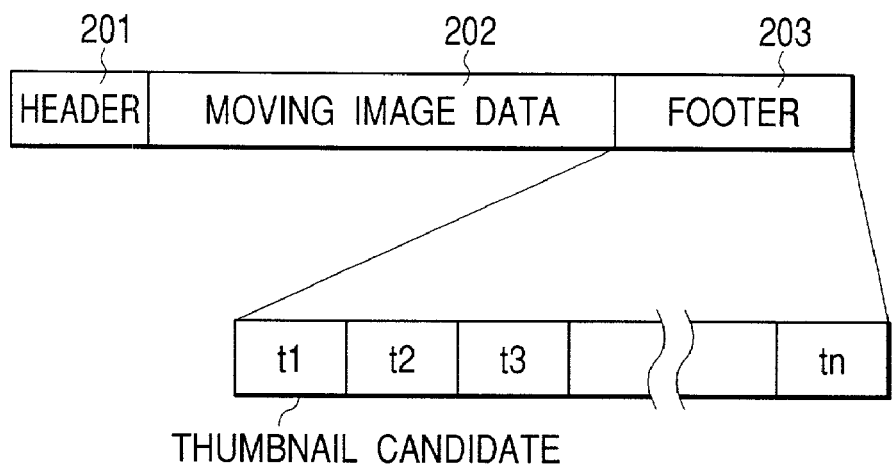
FIG. 2 is a view showing a structure of a moving image file processed in an embodiment of the invention.

FIG. 2 shows a file format of a moving image file recorded on the disk D by the camcorder 100 of the embodiment.

The file format includes areas of a header 201, moving image data 202 and a footer 203, arranged in this order from a file head. The moving image data area 202 stores a moving image stream encoded by the MPEG circuit 104. The footer area 203 stores the above-described thumbnail data by a plurality of frames. The header area 201 stores additional information of the moving image data such as a length of the moving image data area 202 and a title, as well as a pointer indicating a thumbnail image of one frame selected as a representative thumbnail corresponding to the moving image data from the plurality of thumbnail candidate data stored in the footer area 203.

Next, description is made of an operation when a moving image is actually recorded.

According to the embodiment, a user can control recording start and end by operating "RECORDING START" and "RECORDING END" keys included in the key operation unit 112, and one moving image file is formed at each time when recording is ended. For each instruction of recording start and end, a plurality of moving image files having different picture recording time are recorded on the disk D.

When the user operates the "RECORDING START" key to instruct recording to be started, the format unit 107 and the recording and reproducing unit 109 secure header and footer areas on the disk D according to an instruction from the system control unit 111, and then start recording of an encoded moving image stream into a moving image data area.

Simultaneously with the starting of the moving image data recording, the JPEG circuit 105 starts generation of thumbnail candidate data according to the instruction of the system control unit 111. That is, the JPEG circuit 105 extracts one frame from moving image data outputted from the camera signal processing unit 102 at every fixed period after starting of a head frame of the moving image data to be recorded, reduces the extracted frame to a proper picture size, and then encodes the reduced frame according to JPEG Standard to generate thumbnail candidate data.

In this case, to generate the thumbnail candidate data, not only one frame is merely extracted from the moving image data at every fixed period but the extraction operation can be combined with much higher level processing, for example a recognizing of great change of a content of an image by using special image recognizing means to extract a frame of such the image.

The thumbnail candidate data generated in such the manner are then sent in the order of generation through the data bus 115 to the format unit 107. The format unit 107 temporarily stores the received thumbnail candidate data in the work memory 108.

When the user operates the "RECORDING END" key, the format unit 107 and the recording and reproducing unit 109 end the recording of the moving image data into the moving image data area on the disk D according to instruction from the system control unit 111, then read the thumbnail candidate data from the work memory 108, and record the read data into the footer area on the disk D. Also, data attached to the moving image information is recorded into the header area on the disk D at this time.

The reason why data is recorded into the header area after the instruction of the recording stop is that the header area contains information not established until the end of recording, such as a length of moving image data, and the data must be recorded after the user instructs a recording end. Such additional information contains pointer information indicating a representative thumbnail among the thumbnail candidate data of the plurality of frames stored in the footer. In the first recording, for example, thumbnail candidate data corresponding to a head frame among the plurality of thumbnail candidate data is indicated by the pointer information.

Thus, the moving image file recorded on the disk D stores the moving image stream encoded according to MPEG in the moving image data area, the additional information of the moving image data in the header area, and the plurality of thumbnail candidate data in the footer area.

Next, description is made of a basic operation flow in reproducing.

According to the embodiment, the user can instruct reproducing start and end by operating "REPRODUCING START" and "REPRODUCING STOP" keys included in the key operation unit 112.

Since the plurality of moving image files have been recorded on the disk D as described above, actually, the user must instruct which moving image file should be reproduced before reproducing is started.

Figure 3:
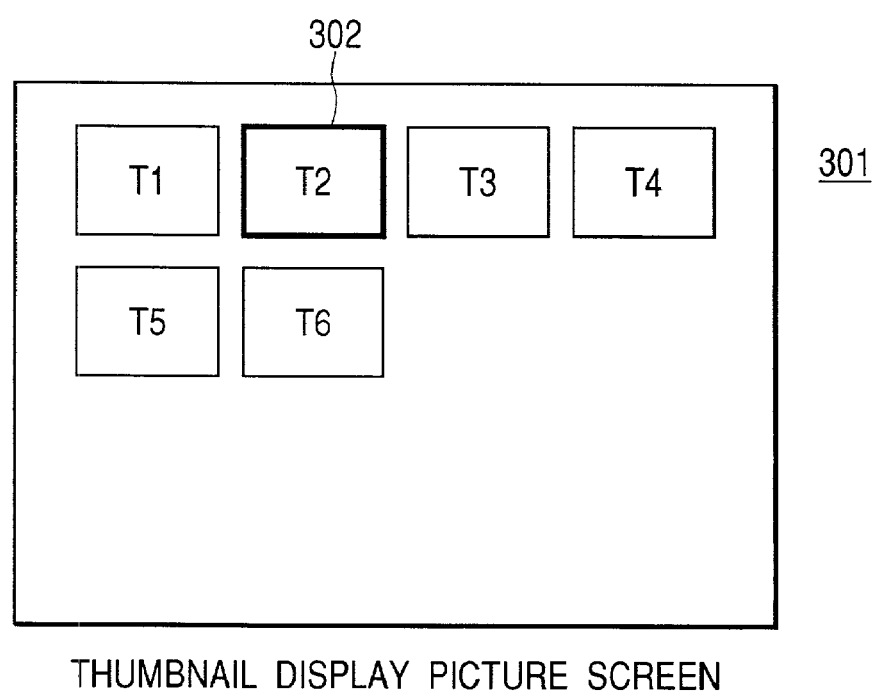
FIG. 3 is a view showing a display picture screen of a thumbnail image in the embodiment of the invention.

In the embodiment, while the camcorder 100 is in a stopped state, the system control unit 111 reproduces the representative thumbnail image data from the moving image files on the disk D, and controls each circuit of the camcorder 100 to display the representative thumbnail image on the display unit 103 as shown in FIG. 3. The user specifies a target moving image file among such representative thumbnail images displayed on the display unit 103 by operating the key operation unit 112.

As shown in FIG. 3, a display picture screen 301 of the representative thumbnails also displays a focus mark (indicated by a thick frame 302 in FIG. 3) indicating one of the thumbnails. The user moves this focus mark 302 by using a "TO NEXT" button or a "BACKWARD" button included in the key operation unit 112 to specify a target file.

Whet the user specifies the file and operates the "REPRODUCING START" key, the system control unit 111 controls the recording and reproducing unit 109 to reproduce data of the specified moving image file from the disk D. The format unit 107 processes the reproduced moving image file to detect a moving image stream, and outputs the moving image stream through the data bus 115 to the MPEG circuit 104. The MPEG circuit 104 decodes the outputted moving image data, and sends the decoded data through the base band data bus 114 to the display unit 103 and the AV I/O unit 113.

The display unit 103 displays a moving image related to the moving image data outputted through the data bus 114 on the liquid crystal panel. The AV I/O unit 113 sends the moving image data outputted through the data bus 114 to an external television monitor or the like.

The moving image stream that has been outputted through the data bus 115 to the MPEG circuit 104 is also fetched in the network I/F 106, converted into a format conformed to Standard of IEEE1394, and sent through the terminal 116 to the network.

As described above, in the embodiment, while the camcorder 100 is in a stopped state, the representative thumbnails of the moving image files are left being displayed on the display unit 103 as shown in FIG. 3.

In FIG. 3, T1 to T6 represent representative thumbnail images of six different moving image files, and a situation of recording of six moving image files on the disk D is shown. The thumbnails T1 to T6 of FIG. 3 are thumbnail images indicated by pointers stored in the header area of the moving image file, and each is a head frame of moving image data when photographing of each moving image file is just finished.

As described above, when the head frame is used as a representative thumbnail, it is not always a real help to selection of a moving image file.

For example, if moving image data corresponding to the representative thumbnail T2 in FIG. 3 is started in the fading-in manner from a black picture screen, the thumbnail T2 as its head frame is a totally black picture, not reflecting a content of the moving image file.

According to the embodiment, even in such the case, the user can optionally specify a much better representative thumbnail by the following process.

That is, while the representative thumbnail of each moving image file is displayed on the display unit 103, the user focuses on the thumbnail T2 by using the "TO NEXT" or "BACKWARD" button included in the key operation unit 112, and specifies a thumbnail selection mode by operating a "SELECTION MODE" key also included in the key operation unit 112.

Hereinafter, description is made of processing of the system control unit on the thumbnail selection mode by referring to FIGS. 4 and 5.

Figure 4:
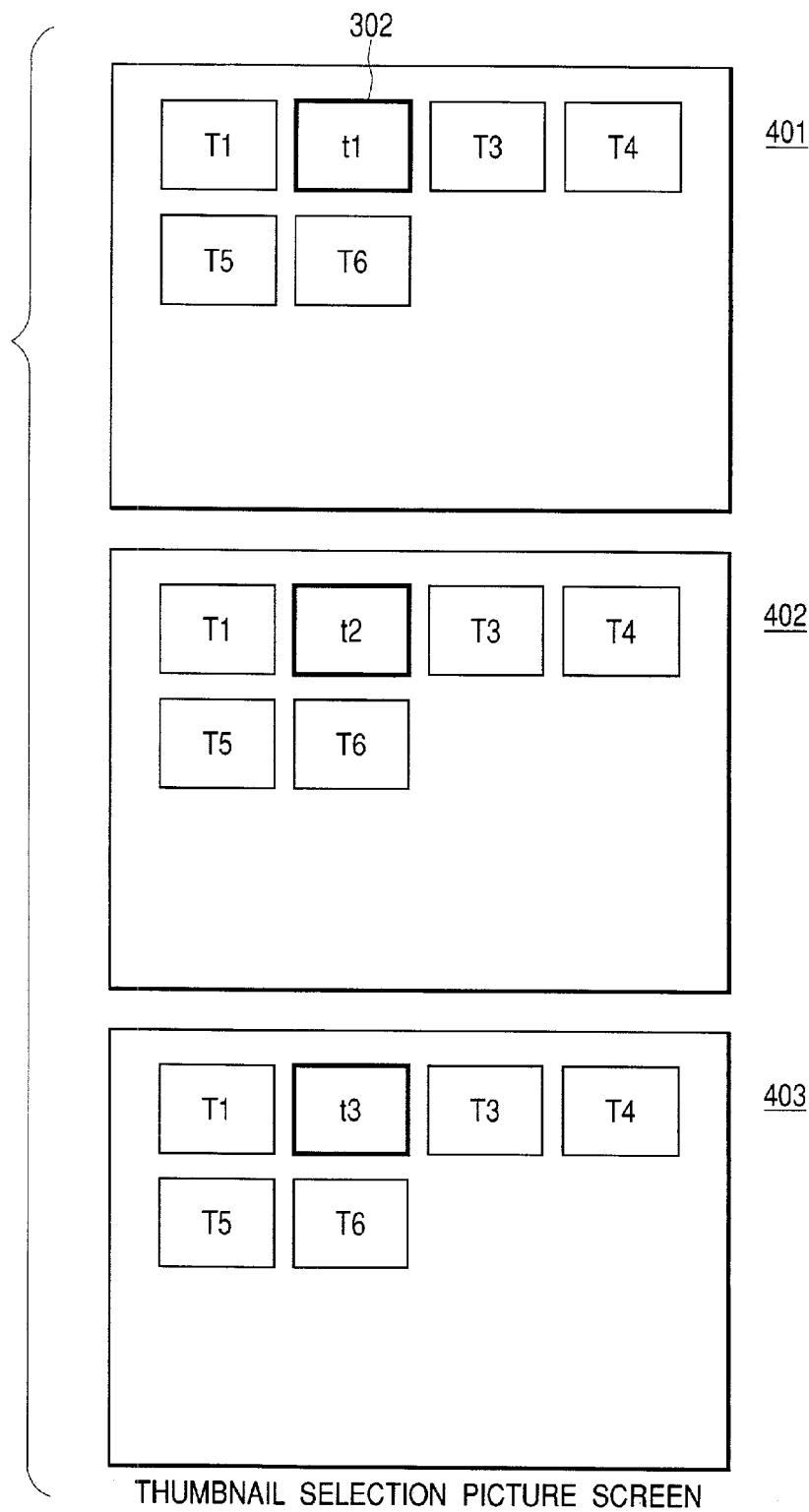
FIG. 4 is a view showing a set picture screen of the thumbnail image in the embodiment of the invention.
Figure 5:
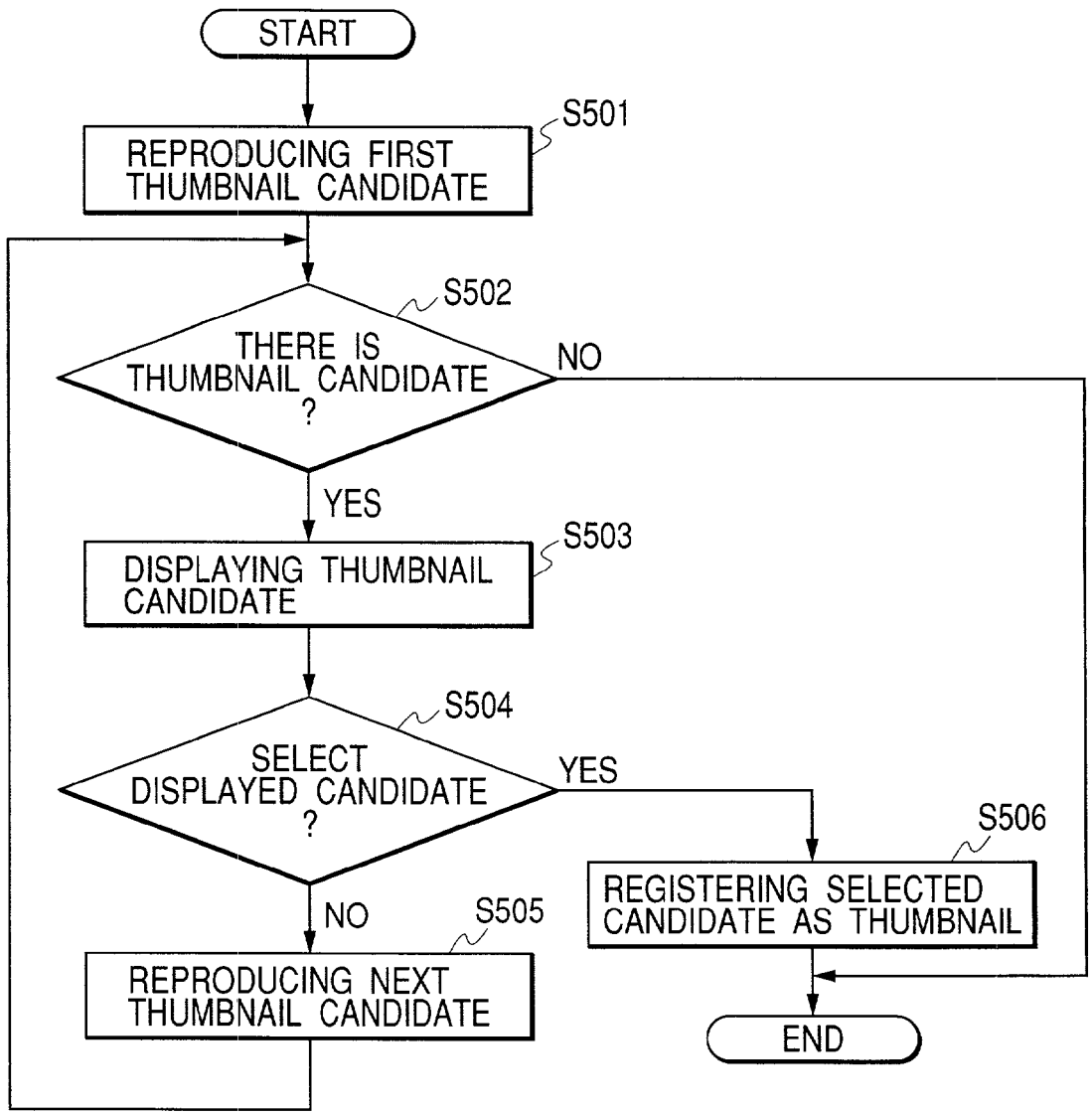
FIG. 5 is a flowchart showing a thumbnail setting operation.

FIG. 4 shows a content displayed on the display unit 103 in the thumbnail selection mode; and FIG. 5 a flowchart showing an operation of the system control unit 111 in the thumbnail selection mode.

When the thumbnail selection mode is started while the focus mark 302 is set in the thumbnail T2, the system control unit 111 controls the recording and reproducing unit 109 to read data stored in a position of a first thumbnail candidate in a footer area of a moving image file corresponding to the thumbnail T2 in step S501. Then, in step S502, determination is made as to whether the read data is thumbnail candidate data or not based on reproduced data. If YES, in step S503, the thumbnail candidate data is decoded by the JPEG circuit 105, and then displayed as t1 on the display unit 103 as shown in 401 of FIG. 4.

If the data read in step S502 is not thumbnail candidate data, then the thumbnail selection mode is finished.

After the displaying of the thumbnail candidate t1 in step S503, in step S504, the process waits for user's determination as to whether or not to select the thumbnail candidate t1 as a thumbnail. The thumbnail candidate t1 displayed here is a head frame, the same as T2.

The user can enter selection/non-selection of an image of the displayed thumbnail candidate by using an "ESTABLISH" key or the "TO NEXT" key included in the key operation unit 112. If the user operates the "ESTABLISH" key to enter establishment of the displayed thumbnail key t1 as a thumbnail, the format unit 107 and the recording and reproducing unit 109 are controlled in step S506 to register the thumbnail candidate t1 as a representative thumbnail of the moving image file. That is, a pointer indicating the thumbnail candidate t1 is written in a predetermined place in a header area of the moving image file, and then the thumbnail selection mode is finished.

If the user operates the "TO NEXT" key to enter non-establishment of the displayed thumbnail candidate t1 as a thumbnail, in step S505, the recording and reproducing unit 109 reproduces next thumbnail candidate data. Then, in step S502, determination is made again as to whether the reproduced data is a thumbnail candidate or not.

If the read data is a thumbnail candidate t2, in step S503, thumbnail candidate data is decoded similarly to the above, to be displayed on the display unit 103 as shown in 402 of FIG. 4, and the process waits for user's determination in step S504.

Thus, the thumbnail selection mode repeats a processing loop until no more thumbnail candidates are present, and then comes to an end. For example, if a thumbnail candidate t3 is determined to best represent a feature of the moving image file, the user establishes the thumbnail candidate t3 as a representative thumbnail. Thereafter, the set thumbnail t3 is displayed as a representative thumbnail T2 in place of the thumbnail of the totally black picture screen.

Thus, according to the embodiment, in recording of the moving image file, image data of a plurality of thumbnail candidates are extracted from recorded moving image data by a predetermined timing, and stored in a moving image file. After the recording, an image to be used as a representative thumbnail can be selected from the plurality of thumbnail candidates. Accordingly, it is possible to set a thumbnail image best indicating a content of the moving image file by a simple configuration, greatly helping user's selection of a moving image file.

In the embodiment, when the representative thumbnail is set, as shown in FIG. 4, the thumbnails of the target moving image file are switched from one picture screen to another, i.e., t1 to t2, and t2 to t3. Other than this arrangement, a list of still images of a plurality of frames as thumbnail candidates may be displayed on the same picture screen, enabling the user to select a representative thumbnail by comparing the thumbnail candidates list-displayed with one another.

Next, description is made of a second embodiment by referring to FIG. 1 as in the case of the first embodiment.

In the first embodiment, the thumbnail candidates were generated when photographing is performed. In the present embodiment, however, thumbnail candidates are generated by using moving image data recorded already in a disk D. Functions of the elements shown in FIG. 1 are similar to those of the first embodiment. Also, operations other than those in thumbnail candidate generation are similar to those (operations at photographing and recording, reproducing, and on the representative thumbnail selection mode).

Also in the present embodiment, as described above, recording of moving image data is started according to instruction of a recording start by a key operation unit 112 and, simultaneously, thumbnail candidate generation by a JPEG circuit 105 is carried out. After recording of a moving image file is finished according to instruction of a recording end, a user operates a "THUMBNAIL CANDIDATE GENERATION PERMIT" key of the key operation unit 112 to start off-line thumbnail candidate generation.

In the embodiment, the thumbnail candidate generation is executed as a background job. Upon reception of instruction of thumbnail candidate generation, a system control unit 111 controls a recording and reproducing unit 109 to reproduce moving image data from the disk D, and sends encoded moving image data stream through a format unit 107 and a data bus 115 to an MPEG circuit 104. The MPEG circuit 104 decodes the received moving image data, and sends the decoded data to a data bus 114.

On a normal reproducing mode, the moving image data sent to the data bus 114 is outputted to a display unit 103 and an AV I/O unit 113. However, since the thumbnail candidate generation is executed as the background job, the moving image data is not outputted to the display unit 103 or the AV I/O unit 113, but fetched by the JPEG circuit 105.

According to instruction from the system control unit 111, the JPEG circuit 105 extracts at a predetermined timing image data of one frame from the moving image data fetched through the data bus 114, generates thumbnail candidate data, and sends the generated data through the data bus 115 to the format unit 107 again. The format unit 107 temporarily stores the received thumbnail candidate data in a work memory 108.

After an end of the reproducing of the moving image data of one moving image file, the generation of thumbnail candidates by the JPEG circuit 105 is also finished. After an end of the generation of all thumbnail candidate data, the format unit 107 outputs the thumbnail candidate data stored in the work memory 108 to the recording and reproducing unit 109. The recording and reproducing unit 109 records these thumbnail candidate data in a footer area of the original moving image file in addition to the thumbnail candidate data generated at recording.

A process thereafter is similar to that of the first embodiment, i.e., selection of a representative thumbnail described above with reference to FIGS. 4 and 5.

For example, if an extracting interval of thumbnail candidates extracted at photographing is too long, the configuration of the embodiment enables thumbnail candidates to be regenerated at a shorter interval. Thus, more effective thumbnail candidates can be obtained, thereby making it possible to specify a more proper representative thumbnail.

Next, description is made of a third embodiment of the invention.

Even when a moving image file formed by the camcorder of FIG. 1 is moved or copied to another apparatus or system as described above, the moving image file still contains a plurality of thumbnails. Thus, a representative thumbnail can be easily set again at the moving or copying destination.

Even in the case of a moving image file having a similar content, an optimal representative thumbnail may change depending on an environment. For example, there may be a case that a moving image file having a similar content may have been already saved in a recording medium of the copying destination. Even in this case, the configuration of the embodiment enables the user to easily set a thumbnail again.

Next, description is made of an embodiment, where the invention is applied to a personal computer (PC) incorporating a recording medium having a copied moving image file formed by the camcorder of FIG. 1.

Figure 6:
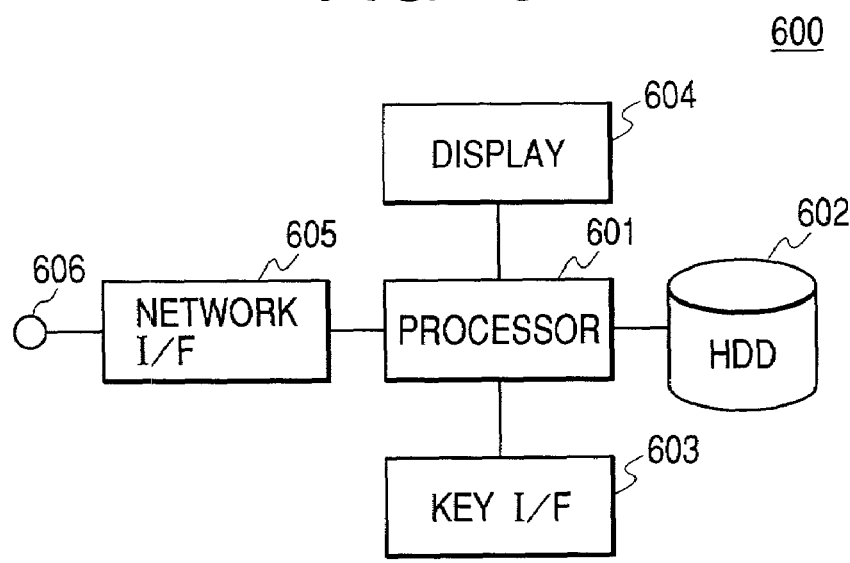
FIG. 6 is a view showing a configuration of a personal computer system, to which the invention is applied.

FIG. 6 is a block diagram showing an internal configuration of a PC 600, to which the invention is applied.

A reference numeral 601 denotes a processor including not only a CPU but also a peripheral circuit such as an external memory; 602 a memory unit including a hard disk drive (HDD); 603 a key interface (I/F) including pointing devices, i.e., a key board, a mouse and the like, and adapted to process inputs from a user; 604 a display including a monitor and a display control circuit, and adapted to process displaying to the user; 605 a network interface (I/F); and 606 a network terminal.

Figure 7:
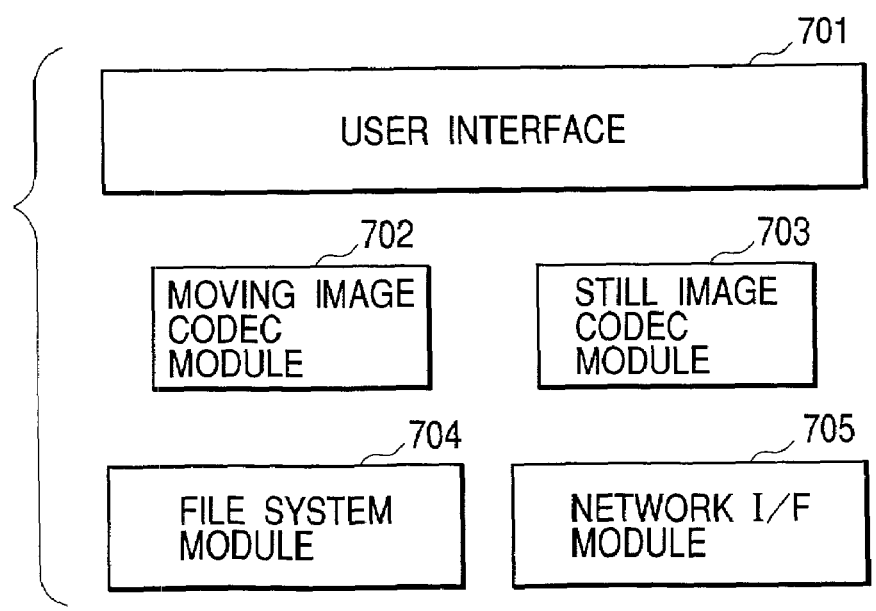
FIG. 7 is a view showing a situation of program modules in the computer system of FIG. 6.

FIG. 7, is a functional block diagram showing software programs used in the PC 600.

A reference numeral 704 denotes a file system module for controlling the HDD 602 to provide file system services to a higher layer; 705 a network interface module for controlling the network I/F 605 to provide network services to the higher layer; 702 a moving image encoding/decoding (moving image CODEC) module; and 703 a still image encoding/decoding (still image CODEC) module respectively for providing moving and still image encoding/decoding services to the upper layer, both 702 and 703 being intermediate modules using only resources of the processor 601. A reference numeral 701 denotes a user interface (UI) module for controlling the key I/F 603 and the display 604 to input/output data from/to a user. In addition, the UI module 701 controls the entire software programs of the embodiment according to the input/output information from/to the user.

Next, description is made of a basic operation flow in reproducing in the embodiment.

In the embodiment, the user controls the system by using graphic user interface (GUI) realized by the UI module 701 using the display 604 and the key I/F 603.

Specifically, by clicking a "REPRODUCING START" button or a "REPRODUCING STOP" button displayed on the monitor of the display 604 with the mouse which is a pointing device included in the key I/F 603, the user can control a reproducing start or stop.

As described above, the HDD 602 of the present embodiment stores therein a plurality of moving image files generated by the camcorder 100 shown in FIG. 1. Thus, a user has to instruct which moving image file should be reproduced, before start of reproduction.

In the present embodiment, when the software program is not reproducing any moving image files, the processor 601 reads and decodes representative thumbnail image data of each moving image file stored in the HDD 602, and the representative thumbnail images are displayed on the monitor of the display 604 as shown in FIG. 3.

The user specifies a target moving image file among the displayed images. As shown in FIG. 3, a display picture screen of the representative thumbnails displays a focus mark 302 indicating one of the images, and the user can specify a target file by pressing a "TO NEXT" button or a "BACKWARD" button provided in GUI on the monitor.

When the user specifies the file and clicks the "REPRODUCING START" button, the file system module 704 reads the target moving image file stored in the HDD 604, and passes the file to the moving image CODEC module 702. The moving image CODEC module 702 decodes the received moving image data, and passes the decoded data to the UI module 701. The UI module 701 displays the reproduced moving image on the display 604.

As described above, in the embodiment, when the software program is not reproducing any moving image files, the representative thumbnails of the moving image files are displayed on the monitor of the display 604 as shown in FIG. 3.

The user specifies an image among the thumbnail images corresponding to the target moving image file.

Reference numerals T1 to T6 in FIG. 3 denote representative thumbnails of the moving image files. Here, a case of six moving image files recorded in the HDD 604 is specifically shown. The thumbnails T1 to T6 shown in FIG. 3 are thumbnail images indicated by pointers stored in header areas of the moving image files.

As described above, the representative thumbnail images are not always accurate representation of contents of the moving image files. In addition, as described above with reference to the first embodiment, even if proper representative thumbnails have been set in the camcorder, the representative thumbnail images do not always still remain proper after data copying in the PC system.

For example, it is conceivable that a moving image file of a similar content has been already stored in the hard disk drive of the PC. In this case, a representative thumbnail image must be specified again. According to the embodiment, a more proper representative thumbnail can be specified by the following process.

While the representative thumbnail images are displayed on the display 604 as shown in FIG. 3, the user operates the "TO NEXT" or "BACKWARD" button included in GUI displayed on the display 604 by the key I/F 603, to set a focus mark 302 to T2 of FIG. 3, and then clicks a "SELECTION MODE" button similarly included in GUI by the Key I/F 603 to set the system on a thumbnail selection mode.

FIG. 4 shows a content displayed on the display 604 on the thumbnail selection mode; and FIG. 5 a flowchart showing an operation of the processor 601 on the thumbnail selection mode of the embodiment.

Hereinafter, description is made of processing of the PC 600 on the thumbnail selection mode by referring to FIGS. 4 and 5.

When the thumbnail selection mode is started while a focus is set in the thumbnail T2 shown in FIG. 3, the file system module 704 of the processor 601 reads data stored in a position of a first thumbnail candidate in a footer area of a moving image file corresponding to the thumbnail T2 from the HDD 602 in step S501.

Then, in step S502, determination is made based on reproduced data, as to whether the read data is thumbnail candidate data or not. If YES, in step S503, the thumbnail candidate data is decoded by the still image CODEC module 703, and then displayed as t1 on the display 604 as shown in 401 of FIG. 4.

If the data read in step S502 is not thumbnail candidate data, then the thumbnail selection mode is finished.

After the displaying of the thumbnail candidate t1 in step S503, in step S504, the process waits for user's determination as to whether or not to select the displayed thumbnail candidate t1 as a thumbnail. The thumbnail candidate t1 displayed here is a head frame, the same as T2.

The user can enter selection/non-selection of an image of the displayed thumbnail candidate by using an "ESTABLISH" button or the "TO NEXT" button included in the key I/F 603. If the user operates the "ESTABLISH" button to enter establishment of the displayed thumbnail key t1 as a thumbnail, the file system module 704 registers the thumbnail candidate t1 as a representative thumbnail of the moving image file in step S506. That is, a pointer indicating the thumbnail candidate t1 is written in a predetermined place in a header area of the moving image file, and then the thumbnail selection mode is finished.

If the user presses the "TO NEXT" button to enter non-establishment of the displayed thumbnail candidate t1 as a thumbnail, in step S505, the file system module 704 reproduces next thumbnail candidate data by the recording and reproducing unit 109. Then, in step S502, determination is made again as to whether the reproduced data is a thumbnail candidate or not.

If the read data is a thumbnail candidate t2, in step S503, the thumbnail candidate data is decoded by the still image CODEC module 703 similarly to the above, to be displayed on the display 604 as shown in 402 of FIG. 4, and the process waits for user's determination in step S504.

Thus, the thumbnail selection mode repeats a processing loop until no more thumbnail candidates are present, and then comes to an end. For example, if a thumbnail candidate t3 is determined to best represent a feature of the target moving image file, the user establishes the thumbnail candidate t3 as a representative thumbnail. Thereafter, the set thumbnail t3 is displayed as a representative thumbnail T2.

Thus, according to the embodiment, even when a moving image file having a plurality of thumbnail candidates is copied to the external apparatus such as a PC, an image to be used as a representative thumbnail can be selected from the plurality of thumbnail candidates at the PC which is the copying destination. Therefore, it is possible to easily set a thumbnail image again at the copying destination.

Next, description is made of a fourth embodiment of the invention.

In the previous embodiments, the thumbnail image was set again by using the camcorder or the PC singly. Needless to say, however, the embodiment can be applied to a system having the camcorder and the PC interconnected through a network.

The fourth embodiment is now described by way of example, where the invention is applied to a system composed of a camcorder and a PC, a moving image file photographed by the camcorder and recorded in a disk is controlled by the PC connected through a network to select a representative thumbnail proper for the moving image file.

Figure 8:
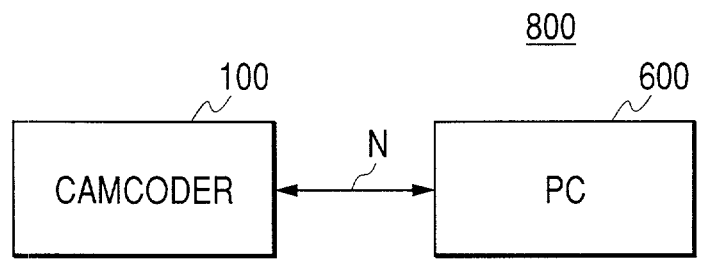
FIG. 8 is a view showing a configuration of a system, to which the invention is applied.

FIG. 8 is a block diagram showing a configuration of a system 800, to which the invention is applied. The system 800 of FIG. 8 includes a camcorder 100 shown in FIG. 1 and a PC 600, which are interconnected through a network N.

In the system 800 of FIG. 8, a network terminal 116 of FIG. 1 and a network terminal 606 of FIG. 6 are interconnected through the network N to enable bidirectional communication to be performed. For a physical layer of communication, a serial bus of IEEE1394 is used as described above, and thus command and file data transfer can be carried out.

The components, i.e., the camcorder 100 and the PC 600 of FIG. 8 are similar to those described above. Also, a functional block of software programs of the PC system 600 shown in FIG. 7 is similar to that described above. A photographed moving image file is recorded in a disk D of FIG. 1, and this recording operation is also similar to that of the first embodiment.

Next, detailed description is made of operations in reproducing and representative thumbnail specification.

First, description is made of a basic operation flow of reproducing according to the embodiment.

In the embodiment, a user controls an operation of the system 800 by using GUI provided by a UI module 701 of the PC 600 shown in FIG. 7.

Specifically, the user can control a reproducing start or end by clicking a "REPRODUCING START" or "REPRODUCING END" button displayed on a monitor of a display 604 of FIG. 6 with a mouse included in a key I/F 603.

On the other hand, a plurality of moving image files have been already recorded in the disk D of FIG. 1, and the user must specify before a start of reproducing, which moving image file should be reproduced.

In the embodiment, when a software program of the PC system 600 is not reproducing any moving image file and the camcorder 100 is in a stopped state, representative thumbnails of moving image files recorded on the disk D are displayed on the display 604 of the PC 600 as shown in FIG. 3. The user specifies a target moving image file among the displayed files.

Specifically, a network I/F module 705 of FIG. 7 controls the network I/F 605 of FIG. 6, to issue a control command to the camcorder 100 to reproduce the representative thumbnail of each moving image file recorded in the disk D and send it to the PC 600.

In the camcorder 100, a network I/F 106 recognizes the command, and notifies a content of the command to a system control unit 111. The system control unit 111 controls the recording and reproducing unit 109 according to this control command to reproduce image data of the representative thumbnail of each moving image file recorded on the disk D, and output the reproduced data through a format unit 107 and a data bus 115 to the network I/F 106. The network I/F 106 changes the received thumbnail image data, that is, image data subjected to JPEG encoding, according to a format of IEEE1394, and outputs the changed image data through the terminal 116 to the PC 600.

A network I/F 605 of the PC 600 outputs the received representative thumbnail image data to a processor 601. The processor 601 detects that the data entered from the network I/F module 705 is representative thumbnail image data, and the UI module 701 displays the representative thumbnail image on the display 604 as shown in FIG. 3.

As shown in FIG. 3, a display picture screen of representative thumbnails displays a focus mark 302 indicating one of the thumbnails. The user can specify a target file by moving the focus mark 302 using a "TO NEXT" or "BACKWARD" button provided in GUI. When the user specifies a file and clicks a "REPRODUCING START" button, this information is sent from the UI module 701 of FIG. 7 to the network I/F module 705, and then transmitted from the processor 601 of FIG. 6 through the network I/F 605 and the network terminal 606 to the camcorder 100.

In the camcorder 100, when the network terminal 116 receives a command of a reproducing start, the network I/F circuit 106 interprets the reproducing start command, and reports it to the system control unit 111. Then, according to instruction of the system control unit 111, the recording and reproducing unit 109 reads the specified moving image file from the disk D, and detects a moving image stream by decoding and unpacketizing of the disk file system at the format unit 107. The reproduced moving image stream is passed as an MPEG stream through the data bus 115 to the network I/F circuit 106.

The network I/F circuit 106 packetizes the received moving image stream according to IEEE1394 Standard, and sends it through the network terminal 116 to the PC system 600.

In the PC system 600, when the moving image stream is received by the network terminal 606, the data is sent through the network I/F 605 to the processor 601. In the processor 601, an IEEE1394 packet is unpacketized by the network I/F module 705 shown in FIG. 7 to recompose an original MPEG stream, and then this moving image data is passed to a moving image CODEC module 702. The moving image CODEC 702 decodes the received moving image data, and sends the decoded data to the UI module 701. The UI module 701 displays the reproduced moving image on the display 604.

According to the embodiment, if a software program of the PC 600 is not processing the moving image file reproduced from the disk D of FIG. 1, the representative thumbnails of the moving image files recorded on the disk D are displayed on the display 604 as shown in FIG. 3. The user specifies a target moving image file among the displayed files.

In the embodiment, as in the case of the previous embodiments, the user can optionally change the displayed representative thumbnails.

For example, to change a representative thumbnail T2, the user operates the "TO NEXT" or "BACKWARD" button included in GUI displayed on the display 604 by the UI module 701, to set a focus mark 302 to T2, and then clicks a "SELECTION MODE" button similarly included in GUI to set the system on a thumbnail selection mode.

FIG. 1 shows a content displayed on the display 604 on the thumbnail selection mode.

When the thumbnail selection mode is started while a focus is set on the thumbnail T2, the UI module 701 specifies reproducing of data located in a place of a first thumbnail candidate in a footer area of a moving image file corresponding to T2. This command is transmitted not to the file system module 704 but to the network I/F module 705.

At the network I/F module 705, the command is converted into a command defined in IEEE1394 meaning "DATA ACQUISITION OF FIRST THUMBNAIL CANDIDATE", and then sent from the processor 601 through the network I/F 605 and the network terminal 606 to the camcorder 100.

In the camcorder 100, upon reception of the command at the network I/F 116, the network I/F circuit 106 interprets the command of "DATA ACQUISITION OF FIRST THUMBNAIL CANDIDATE", and reports it to the system control unit 111. Upon receiving the command, the system control unit 111 controls the recording and reproducing unit 109 to read out data of a first thumbnail candidate recorded in a footer area of the specified moving image file among the moving image files recorded on the disk D, and output the read-out data to the format unit 107.

The format unit 107 performs decoding and packetizing of the disk file system on the reproduced data, and outputs the processed data as the data of the first thumbnail candidate to the network I/F circuit 106 through the data bus 115.

The network I/F circuit 106 converts the reproduced thumbnail candidate data into a format conformed with IEEE1394, to send the converted data through the network terminal 116 to the PC system 600.

In the PC system 600, upon reception of the data including the thumbnail candidate at the network terminal 606, the data is outputted through the network I/F 605 to the processor 601. In the processor 601, the network I/F module 705 shown in FIG. 7 unpacketizes the data packet of the IEEE1394 format, and passes it to the UI module 701.

The UI module 701 analyzes the received data to determine whether or not the candidate is a real thumbnail candidate and, if YES, sends the thumbnail candidate data to a still image CODEC module 703. The still image CODEC module 703 decodes this thumbnail candidate data, and the UI module 701 displays the decoded thumbnail image data on the display 604 as indicated by t1 in 401 of FIG. 4. If the data sent from the camcorder 100 is not a thumbnail candidate, the thumbnail selection mode is finished.

After the displaying of the thumbnail candidate t1, the UI module 701 waits for user's determination as to whether the displayed thumbnail candidate t1 is selected as a representative thumbnail or not. The user can enter own determination by operating the key I/F 603 to instruct an "ESTABLISH" or "TO NEXT" button displayed on the display 604.

If the user clicks the "ESTABLISH" button to establish the displayed thumbnail candidate t1 as a thumbnail, the thumbnail candidate t1 is registered as a representative thumbnail of the moving image file. That is, a pointer indicating the thumbnail candidate t1 is written in a predetermined area of a header area of the moving image file, and then the thumbnail selection mode is finished. This operation is achieved in the following manner.

The operation of the "ESTABLISH" button by the user is notified from the UI module 701 to the network I/F module 705. The network I/F module 705 generates a command of IEEE1394 meaning "REGISTRATION OF THUMBNAIL CANDIDATE t1 AS REPRESENTATIVE THUMBNAIL" according to the operation instruction, and sends the command from the processor 601 through the network I/F 605 and the network terminal 606 to the camcorder 100.

In the camcorder 100, upon reception of the command at the network terminal 116, the network I/F circuit 106 interprets the command of "REGISTRATION OF THUMBNAIL CANDIDATE t1 AS REPRESENTATIVE THUMBNAIL", and reports it to the system control unit 111. The system control unit 111 controls the format unit 107 and the recording and reproducing unit 109 to write a pointer indicating the thumbnail candidate t1 recorded in a footer area of the specified moving image file of the disk D as a representative thumbnail in a predetermined area of a header area of the moving image file, and the thumbnail selection mode is finished.

If the user clicks the "TO NEXT" button not to establish the displayed thumbnail candidate t1 as a thumbnail, data of a next thumbnail candidate is read out. This operation is achieved in the following manner.

The operation of the "TO NEXT" button by the user is notified from the UI module 701 to the network I/F module 705. The network module 705 generates a command of IEEE1394 meaning "DATA ACQUISITION OF NEXT THUMBNAIL CANDIDATE" according to the operation instruction, and sends the command through the network I/F 605 and the network terminal 606 to the camcorder 100.

In the camcorder 100 side, upon reception of the command at the network terminal 116, the network I/F circuit 106 interprets the command of "DATA ACQUISITION OF NEXT THUMBNAIL CANDIDATE", and reports it to the system control unit 111. The system control unit 111 controls the recording and reproducing unit 109 according to the command to read out data of a second thumbnail candidate recorded in the footer area of the specified moving image file of the disk D, and send the read-out data to the format unit 107.

The format unit 107 performs decoding and packetizing of the disk file system on the reproduced data, to output the processed data as the data of the next thumbnail candidate to the network I/F circuit 106 through the data bus 115. The network I/F circuit 106 converts the data into a format conformed with IEEE1394, sends the converted data through the network terminal 116 to the PC system 600.

In the PC system 600, upon reception of the data at the network terminal 606, the data is outputted through the network I/F 605 to the processor 601. In the processor 601, the network I/F module 705 unpacketizes the data packet of the IEEE1394 format, and passes it to the UI module 701. The UI module 701 analyzes the received data to determine whether the data indicates a thumbnail candidate or not.

If the read-out data indicates the thumbnail candidate, then as in the case of t1, the data of the thumbnail candidate is sent to the still image CODEC module 703. The still image CODEC module 703 decodes this thumbnail candidate data, and sends the decoded data again to the UI module 701. The UI module 701 displays the decoded thumbnail image data on the display 604 as indicated by t2 in 402 of FIG. 4, and waits for user's determination again.

Thus, the thumbnail selection mode repeats a processing loop until no more thumbnail candidates are present. Here, for example, if a thumbnail candidate t3 shown in 403 of FIG. 4 best represents features of the target moving image file, the user establishes the thumbnail candidate t3 as a representative thumbnail, and this t3 is displayed as a representative thumbnail t2 thereafter.

As described above, according to the present embodiment, even when the camcorder and the PC system are interconnected through the network, the camcorder and the PC system can select a representative thumbnail while transferring a command or data with each other. Generally, the PC system 600 has a monitor of higher resolution compared with the camcorder 100, and has less constraints on displaying. Thus, it is possible to facilitate the operation of selecting a representative thumbnail from the thumbnail candidates by using GUI of higher definition.

Next, description is made of a fifth embodiment of the invention.

In the above-described fourth embodiment, the plurality of thumbnail candidates are formed simultaneously with the recording of the moving image file by the camcorder 100, and the user sets the representative thumbnail among the plurality of thumbnail candidate by the PC. However, as described above with reference to the second embodiment, processing for forming a thumbnail candidate from moving image data recorded in the disk D can be similarly carried out by controlling the camcorder 100 from the PC 600 side in the system shown in FIG. 8.

The fifth embodiment is now described by way of example, where a camcorder is controlled by a PC connected to the camcorder through a network, and thumbnail candidates are generated and added by using moving image files that have been already recorded in a disk.

The camcorder, the PC and a configuration of a system composed of the camcorder and the PC are similar to those shown in FIGS. 1, 6 and 8. Also, an operation in photographing by the camcorder 100 is similar to that of the first embodiment, and operations in reproducing and on a representative thumbnail selection mode are similar to those of the fourth embodiment.

Hereinafter, description is made of thumbnail candidate data generation according to the embodiment.

According to the present embodiment, as described above with reference to the third or fourth embodiment, a user can control an operation of a system by using GUI achieved by a UI module 701 shown in FIG. 7 using a display 604 and a key I/F 603 of FIG. 6.

When the user clicks a "PERMISSION OF THUMBNAIL CANDIDATE GENERATION" button displayed on the display 604, thumbnail candidate generation is started. The thumbnail candidate generation is executed as a background job so as not to interfere with other operations while a software program of a PC system 600 is not reproducing any moving image files and the camcorder 100 is in a stopped state.

When the generation of thumbnail candidates is instructed, the UI module 701 of FIG. 7 instructs a network I/F module 705 to reproduce target moving image data. This command is converted into a communication command by the network I/F module 705, and sent through a network I/F 605 and a network terminal 606 to the camcorder 100.

In the camcorder 100 side, upon reception of the command at a network terminal 116, a network I/F circuit 106 interprets the moving image acquisition command, and reports it to a system control unit 111. The system control unit 111 controls a recording and reproducing unit 109 according to the command to read out a specified moving image file from a disk D, and output the read-out file to the format unit 107. The format unit 107 performs decoding and packetizing of a disk file system on the reproduced moving image file data to take out a moving image data stream, and outputs the data stream through a data bus 115 to -the network I/F circuit 106. The network I/F circuit 106 converts the reproduced moving image stream into a format conformed with IEEE1394 to send the converted stream through a network terminal 116 to the PC system 600.

In the PC system 600, upon reception of the data at the network terminal 606, the data is outputted through the network I/F 605 to a processor 601. In the processor 601, a network I/F module 705 unpacketizes a packet of IEEE1394 to reconstruct an original MPEG stream, and passes the moving image data to a moving image CODEC module 702.

The moving image CODEC module 702 decodes the received moving image data, and passes the decoded data to a UI module 701. On a normal reproducing mode, the UI module 701 displays a reproduce moving image on the display 604. In the thumbnail candidate generation, however, since decoding is carried out as a background job, no reproduced moving images are displayed on the display 604.

The UI module 701 extracts data of a frame as a thumbnail candidate from the decoded moving image data at a predetermined timing, and sends the extracted data to a still image CODEC module 703. Generally, since the PC 600 has a higher data processing capability than the camcorder 100, it is possible to make determination of a higher level using image processing when a frame as a thumbnail candidate is extracted.

For example, a correlation with a preceding frame or a subsequent frame is calculated, and various thumbnail candidates can be generated by extracting a frame of a lower correlation.

The still image CODEC module 703 generates thumbnail candidate data from image data of the extracted frame, and sends the generated data back to the UI module 701. The UI module 701 passes the received thumbnail candidate data to a file system module 704, and instructs an HDD 602 of FIG. 6 to temporarily store the data.

When generation of all thumbnail candidates for the specified moving image file, the file system module 704 reads out data of a plurality of thumbnail candidates stored in the HDD 602 according to instruction from the UI module 701.

Then, the UI module 701 instructs the network I/F module 705 to update the thumbnail candidate. This command is converted into a communication command by the network I/F module 705, and sent through the network I/F 605 and the network terminal 606 to the camcorder 100.

Also, in this case, the thumbnail candidate data read out from the HDD 602 by the file system module 704 is simultaneously sent to the network I/F module 705, packetized, and then sent through the network I/F 605 and the network terminal 606 to the camcorder 100.

In the camcorder 100, upon reception of the command and the packetized thumbnail candidate at the network terminal 116, the network I/F circuit 106 interprets the thumbnail candidate updating command, and reports it to the system control unit 111. The network I/F circuit 106 unpacketizes the received thumbnail candidate data, and sends it through the data bus 115 to the format unit 107.

The system control unit 111 controls the format unit 107 and the recording and reproducing unit 109 to add the received new thumbnail data as a new thumbnail candidate to a footer area of the specified moving image file on the disk D.

Thus, according to the present embodiment, in the system composed of the camcorder and the PC, by controlling the reproducing operation of the camcorder from the PS side, it is possible to generate and add new thumbnail candidate data from a moving image file that has been already recorded.

Next, description is made of a sixth embodiment of the invention.

The sixth embodiment is described by way of example, where the invention is applied to a system including a relatively small camera having no recording or reproducing functions and a PC interconnected to that camera through a network.

Figure 10:
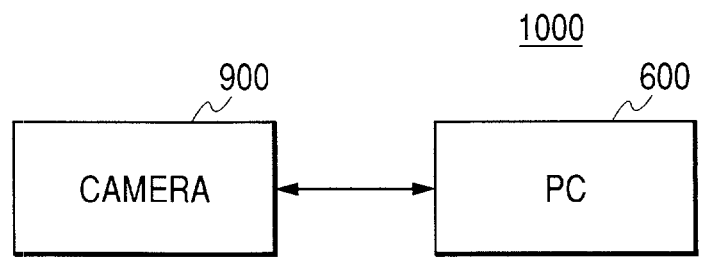
FIG. 10 is a view showing a configuration of a system, to which the invention is applied.

FIG. 10 shows a configuration of a system 1000 of the present embodiment. The system 1000 of FIG. 10 includes a camera 900 and a PC 600, interconnected to each other through a network N. The PC 600 is similar to that shown in FIG. 6 and, also, in the present embodiment, an IEEE1394 serial bus is used for the network N.

Figure 9:
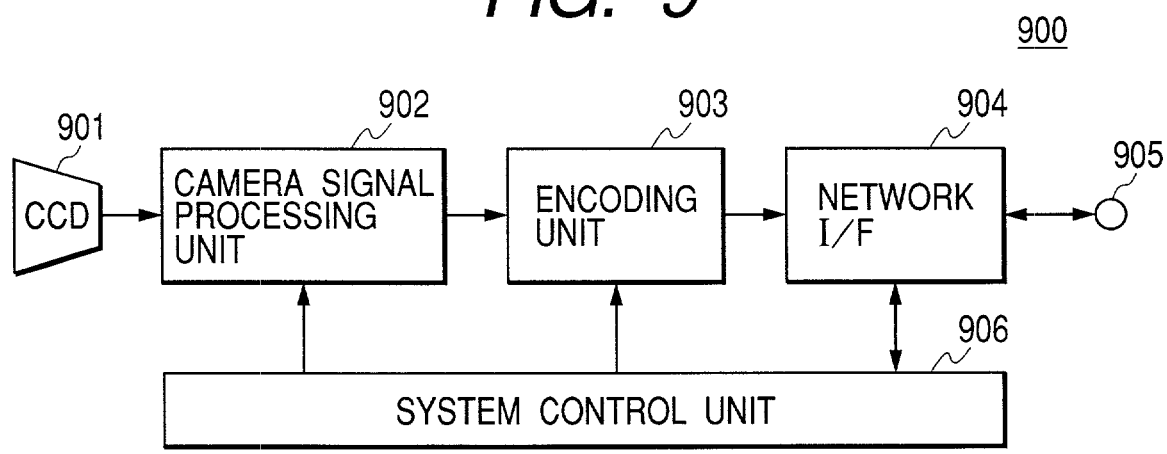
FIG. 9 is a view showing a configuration of a camera, to which the invention is applied.

FIG. 9 is a block diagram showing a configuration of the camera 900 of FIG. 10. In FIG. 9, a reference numeral 901 denotes an image pickup unit, a CCD being used in the present embodiment; 902 a camera signal processing unit; 903 an encoding unit for performing encoding according to MPEG in the embodiment; 904 a network interface (I/F), IEEE1394 being used as a network protocol in the embodiment as described above; 905 a network terminal; and 906 a system control unit for controlling an operation of the camera 900. The terminal 905 of FIG. 9 and the terminal 606 of FIG. 6 are connected to each other to enable bidirectional communication to be executed.

The camera 900 of the present embodiment has no recording functions. Moving image data photographed by the camera 900 is sent from the network I/F 904 through the terminal 905 to the PC 600, and stored in an HDD 602 of the PC 600.

Hereinafter, description is made of basic processing in recording in the embodiment by referring to FIGS. 6, 7, 9 and 10.

In the PC 600 of the embodiment, a user controls an operation of the system by using GUI. This operation is achieved by a UI module 701 of a software program executed by a processor 601 using a display 604 and a key I/F 603.

Specifically, a "RECORDING START" or "RECORDING END" button displayed on the display 604 is clicked by a mouse which is a pointing device included in the key I/F 603. Accordingly, a recording start or end can be controlled.

After the user clicks the "RECORDING START" button to start recording, one moving image file is recorded in the HDD 602 for each clicking of the "RECORDING END" button. A file format of the moving image file recorded in the HDD 602 is similar to that shown in FIG. 2.

When the user clicks the "RECORDING START" button on GUI, its information is sent from the UI module 701 of FIG. 7 to a file system module 704 and a network I/F module 705. The file system module 704 controls the HDD 602 to secure header and footer areas of a moving image file to be stored, and then waits for moving image data sent from the camera 900.

On the other hand, the network I/F module 705 converts the information received from the UI module 701 into a communication command, and sends the command through the network I/F 605 and the network terminal 606 to the camera 900.

In the camera 900 side, upon reception of the command at the network terminal 905, the network I/F circuit 906 interprets the recording start command, and reports it to a system control unit 906. The system control unit 906 controls the camera signal processing unit 902, the encoding unit 903, and the network I/F unit 904 according to this recording start command.

Moving image data photographed by the image pickup unit 901 is subjected to signal processing at the camera signal processing unit 902, and then sent to the encoding unit 903. The encoding unit 903 encodes the moving images data according to MPEG 2, and outputs the encoded data to the network I/F 904. The network I/F converts the encoded moving image data into a format conformed with IEEE1394, and sends the converted data through the network terminal 905 to the PC system 600.

In the PC system 600, upon reception of the data outputted from the camera 900 at the network terminal 606, the data is outputted through the network I/F 605 to the processor 601. In the processor 601, the network I/F module 705 of FIG. 7 unpacketizes a packet of IEEE1394 to reconstruct an MPEG stream, and then sends the moving image data -to the file system module 704 and the moving image CODEC module 702.

The file system module 704 writes the moving image data in the HDD 602. On the other hand, the moving image CODEC module 702 decodes the received moving image data, and passes the decoded data to the UI module 701. The UI module 701 extracts a frame as a thumbnail candidate from the decoded moving image data at a predetermined timing, and sends it to the still image CODEC module 703.

As a method of extracting a frame as a thumbnail candidate, there may be a method of extracting frames at each constant interval. However, various thumbnail candidates can be generated by various processes. For example, a correlation with a preceding frame or a subsequent frame is calculated, and a frame having a lower correlation is extracted.

The still image CODEC module 703 encodes image data of the received frame according to JPEG Standard to generate thumbnail candidate data, and sends the generated data back to the UI module 701. The UI module 701 passes the received thumbnail candidate data to the file system module 704, and instructs the same to temporarily store the data until the user enters a recording end.

When the user clicks the "RECORDING END" button on GUI, the UI module 701 controls the file system module 704 to finish the recording of the moving image data into the moving image data area of the HDD 602, and the file system module 704 records all the temporarily stored thumbnail candidates in the footer area of the moving image file on the HDD 602.

Also, in this case, the file system module 704 stores data attached to the moving image data in the header area. This additional information contains pointer information indicating a representative thumbnail. In first recording, a pointer indicating a thumbnail candidate corresponding to, for example a head frame among the thumbnail candidates in the footer area is recorded.

As described above, for the moving image file recorded in the HDD 602, the MPEG-encoded moving image stream is stored in the moving image data area, the additional information of the moving image data in the header area, and the plurality of thumbnail candidates in the footer area. Thus, in the PC 600, after the recording of the moving image file in the representative thumbnail selection mode described above with reference to the fourth embodiment, the user can select a proper representative thumbnail. Moreover, it is possible to provide thumbnail interface easily understood intuitively to the user.

In the camcorder of FIG. 1, the decoding of an image, audio data, and the like are achieved by the hardware configuration. However, these may be achieved by a software configuration using the processor of the PC of FIG. 6 or the like.

In such a case, a program code of each software module shown in FIG. 7 achieves the above-described function of the embodiment itself, and the program code itself, and means for supplying the program code to a computer, for example a storage medium storing such a program code, constitute the present invention. For the storage medium storing the program code, for example, a floppy disk, a hard disk, an optical disk, a magneto-optical disk, a CD-ROM, a magnetic tape, a nonvolatile memory card, a ROM or the like can be used.

In addition, not only the above-described function of each embodiment is achieved by executing the program code supplied to the computer, but also the function of each embodiment is achieved by operating the program code on the computer by an operating system (OS) or a combination of other application software programs or the like. These program codes are also within the embodiment of the present invention.

Furthermore, after the supplied program code is stored in a memory provided in a function expansion board of the computer or a function expansion unit connected to the computer, a CPU or the like provided in the function expansion board or the function expansion unit executes a part or all of actual processing based on the program code and, by this processing, the function of each embodiment is achieved. This case is also within the present invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus, comprising:

reproducing means for reproducing a moving image file which stores separately moving image data representing a series of moving images, a plurality of candidate image data indicating a plurality of pictures of candidate still images extracted from the moving image data, and identification information identifying candidate image data of one picture selected from the plurality of candidate image data as representative image data of the moving image file from a recording medium;

displaying means for displaying simultaneously a plurality of pictures of candidate still images represented by the plurality of candidate image data stored in the moving image file reproduced by said reproducing means on the same screen of a display device so as to facilitate selection of new representative image data of the moving image file from the plurality of candidate image data;

selecting means for selecting one of the plurality of pictures of candidate still images simultaneously displayed on the screen of the display device as the new representative image data; and a controller for changing the identification information of the moving image file so as to manage the candidate image data indicating the picture of the candidate still image selected by said selecting means as the new representative image data of the moving image file instead of a current representative image data.

2. An apparatus according to claim 1, wherein said reproducing means reproduces a plurality of moving image files respectively storing the moving image data, the identification information and the plurality of candidate image data, and wherein said displaying means displays simultaneously a plurality of pictures of representative still images of the plurality of moving image files reproduced by said reproducing means on the same screen of the display device.

3. An apparatus according to claim 2, wherein said selecting means selects a representative still image corresponding to a specified moving image file among the plurality of moving image files, wherein said displaying means displays simultaneously, in response to the selection of the specified moving image file, the plurality of pictures of candidate still images of the specified moving image file on the same screen of the display device, and said selecting means selects one of the candidate still images displayed on the display device.

4. An apparatus according to claim 1, wherein said selecting means can select only one picture among the still image data of the plurality of pictures.

5. An apparatus according to claim 1, further comprising:
generating means for generating the moving image data;
candidate image processing means for generating the plurality of candidate image data of the moving image data;
identification information processing means for generating identification information for identifying the candidate image data of one picture selected from the plurality of candidate image data generated by said candidate image processing means as representative still image data of the moving image data; and
recording processing means for storing separately therein the moving image data, the plurality of candidate image data and the identification information into one moving image file and recording the moving image file on the recording medium, wherein the moving image data, the plurality of candidate image data and the identification information of the moving image file recorded on the recording medium are capable of being copied from the recording medium into an external device on a file basis.

6. An apparatus according to claim 5, wherein said candidate image processing means extracts image data of a plurality of pictures from the moving image data obtained by said generating means at a predetermined timing, and generates the plurality of candidate image data according to the extracted image data.

7. An apparatus according to claim 6, wherein said candidate image processing means automatically extracts the image data of one picture at every predetermined period.

8. An apparatus according to claim 5, wherein said generating means includes inputting means for inputting the moving image data outputted from an external transmitter.

9. An apparatus according to claim 8, wherein said inputting means inputs encoded moving image data, and said candidate image processing means decodes the moving image data inputted by said inputting means, and generates the plurality of candidate image data by using the decoded moving image data.

10. An apparatus according to claim 9, wherein said candidate image processing means further extracts image data of a plurality of pictures from the decoded moving image data, and generates the plurality of candidate image data by encoding the extracted image data of the plurality of pictures.

11. An apparatus according to claim 5, wherein said candidate image processing means extracts image data of a plurality of pictures from the moving image data based on a change between pictures of the moving image data, and generates the plurality of candidate image data according to the extracted image data of the plurality of pictures.

12. An image processing system, comprising:
a first apparatus for recording and reproducing a moving image file storing moving image data representing a series of moving images, a plurality of candidate image data indicating a plurality of pictures of candidate still images extracted from the moving image data, and identification information identifying candidate image data indicating one picture selected from the plurality of pictures of candidate still images as representative still image data of the moving image file on and from a recording medium, said first apparatus storing separately therein the moving image data, the plurality of candidate image data and the identification information into one moving image file and recording the moving image file on the recording medium; and a second apparatus for inputting the plurality of candidate image data of the moving image file reproduced by said first apparatus, displaying simultaneously a plurality of pictures of candidate still images represented by the inputted plurality of candidate image data on the same screen of a display device so as to facilitate selection of new representative still image data of the moving image file from the plurality of candidate image data, and selecting one of the plurality of pictures of candidate still images indicated by the plurality of candidate image data of the moving image file, wherein said first apparatus changes the identification information of the moving image file so as to manage the candidate image data indicating the picture of the candidate still image data selected by said second apparatus as new representative image data of the moving image file recorded on the recording medium instead of a current representative image data.

13. A system according to claim 12, wherein said first apparatus and said second apparatus are interconnected through a network.

14. A method for processing an image, comprising:
a reproducing step of reproducing a moving image file which stores separately therein storing moving image data representing a series of moving images, a plurality of candidate image data indicating a plurality of pictures of candidate still images extracted from the moving image data, and identification information identifying candidate image data of one picture selected from the plurality of candidate image data as representative image data of the moving image file from a recording medium;

a displaying step of displaying simultaneously a plurality of pictures of candidate still images represented by the plurality of candidate image data stored in the moving image file reproduced in said reproducing step on the same screen of a display device so as to facilitate selection of new representative image data of the moving image file from the plurality of candidate image data;

a selecting step of selecting one of the plurality of pictures of candidate still images simultaneously displayed on the screen of the display device as the new representative image data; and a controlling step of changing the identification information of the moving image file so as to manage the candidate image data indicating the picture of the candidate still image selected in said selecting step as the new representative image data of the moving image file instead of a current representative image data.

15. A method according to claim 14, comprising:

a generating step of generating the moving image data;

a candidate image processing step of generating a plurality of candidate image data of the moving image data;

an identification information processing step of generating identification information for identifying candidate image data of one picture, selected from the plurality of candidate image data generated in said candidate image processing step as representative image data of the moving image data; and a recording processing step of storing separately therein the moving image data, the plurality of candidate image data and the identification information into one moving image file and recording the moving image file on the recording medium, wherein the moving image data, the plurality of candidate image data and the identification information of the moving image file recorded on the recording medium are capable of being copied from the recording medium into an external device on a file basis.

* * * * *

UNITED STATES PATENT AND TRADEMARK OFFICE
CERTIFICATE OF CORRECTION

PATENT NO. : 7,408,581 B2
APPLICATION NO. : 10/108479
DATED : August 5, 2008
INVENTOR(S) : Makoto Gohda It is certified that error appears in the above-identified patent and that said Letters Patent is hereby corrected as shown below:

ON THE TITLE PAGE, AT ITEM (54)
"IMAGE PROCESSING APPARATUS" should read --IMAGE PROCESSING APPARATUS HAVING MOVING IMAGE DATA AND RELATED STILL IMAGE DATA--.

SHEET 6
Fig. 8, "CAMCODER" should read --CAMCORDER--.

COLUMN 4
Line 20, "the" should read --an--.
Line 21, "the" should read --a--.

COLUMN 5
Line 10, "Whet" should read --When--.
Line 50, "the" (second occurrence) should read --a--.

COLUMN 8
Line 20, "key board," should read --keyboard,--.

COLUMN 14
Line 31, "less" should read --fewer--.

COLUMN 15
Line 37, "reproduce" should read --reproduced--.

UNITED STATES PATENT AND TRADEMARK OFFICE
CERTIFICATE OF CORRECTION

PATENT NO. : 7,408,581 B2
APPLICATION NO. : 10/108479
DATED : August 5, 2008
INVENTOR(S) : Makoto Gohda It is certified that error appears in the above-identified patent and that said Letters Patent is hereby corrected as shown below:

COLUMN 17
Line 33, "data – to" should read --data to--.

Signed and Sealed this

Twenty-seventh Day of January, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,408,581 B2
APPLICATION NO. : 10/108479
DATED : August 5, 2008
INVENTOR(S) : Makoto Gohda It is certified that error appears in the above-identified patent and that said Letters Patent is hereby corrected as shown below:

ON THE TITLE PAGE, AT ITEM (54) and Column 1, line 1
"IMAGE PROCESSING APPARATUS" should read --IMAGE PROCESSING APPARATUS HAVING MOVING IMAGE DATA AND RELATED STILL IMAGE DATA--.

SHEET 6
Fig. 8, "CAMCODER" should read --CAMCORDER--.

COLUMN 4
Line 20, "the" should read --an--.
Line 21, "the" should read --a--.

COLUMN 5
Line 10, "Whet" should read --When--.
Line 50, "the" (second occurrence) should read --a--.

COLUMN 8
Line 20, "key board," should read --keyboard,--.

COLUMN 14
Line 31, "less" should read --fewer--.

COLUMN 15
Line 37, "reproduce" should read --reproduced--.

UNITED STATES PATENT AND TRADEMARK OFFICE
CERTIFICATE OF CORRECTION

PATENT NO. : 7,408,581 B2
APPLICATION NO. : 10/108479
DATED : August 5, 2008
INVENTOR(S) : Makoto Gohda It is certified that error appears in the above-identified patent and that said Letters Patent is hereby corrected as shown below:

<u>COLUMN 17</u>
Line 33, "data – to" should read --data to--.

This certificate supersedes the Certificate of Correction issued January 27, 2009.

Signed and Sealed this

Seventeenth Day of February, 2009

JOHN DOLL
*Acting Director of the United States Patent and Trademark Office*